US006781827B2

United States Patent
Goodman et al.

(10) Patent No.: US 6,781,827 B2
(45) Date of Patent: Aug. 24, 2004

(54) STRUCTURE FOR MOUNTING COMPUTER DRIVE DEVICES, PIVOTABLE BETWEEN OPERATING AND SERVICE POSITIONS, AND LATCHABLE IN THE SERVICE POSITION

(75) Inventors: Walter Adrian Goodman, Raleigh, NC (US); John Paul Scavuzzo, Timberlake, NC (US)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 10/372,528

(22) Filed: Aug. 16, 2001

(65) Prior Publication Data

US 2003/0227743 A1 Dec. 11, 2003

(51) Int. Cl.[7] .................................................. G06F 1/16
(52) U.S. Cl. .................... 361/685; 361/683; 312/223.1; 312/330.1; 248/27.1; 248/300
(58) Field of Search .............................. 361/683–686, 361/724–727; 248/300, 694, 27.1, 317, 299.1; 312/223.1, 223.2, 330.1, 265.1–265.6

(56) References Cited

U.S. PATENT DOCUMENTS

| | | | |
|---|---|---|---|
| 4,268,100 A | 5/1981 | Kekas et al. ............ 339/17 LM |
| 5,495,389 A | 2/1996 | Dewitt et al. ................ 361/683 |
| 5,564,804 A | 10/1996 | Gonzalez et al. ......... 312/223.2 |
| 5,572,402 A | 11/1996 | Jeong .......................... 361/685 |
| 5,784,251 A | 7/1998 | Miller et al. ................. 361/683 |
| 5,784,252 A | 7/1998 | Villa et al. ................... 361/683 |
| 5,973,918 A | 10/1999 | Felcman et al. ............. 361/683 |
| 5,995,364 A * | 11/1999 | McAnally et al. .......... 361/685 |
| 6,102,499 A | 8/2000 | Chen et al. .............. 312/223.2 |
| 6,157,540 A | 12/2000 | Eddings et al. ............. 361/727 |
| 6,158,699 A | 12/2000 | Boe .......................... 248/27.1 |
| 6,272,009 B1 * | 8/2001 | Buican et al. ............... 361/683 |
| 6,275,382 B1 * | 8/2001 | Siedow et al. .............. 361/727 |
| 6,386,656 B1 * | 5/2002 | Chen ....................... 312/223.2 |
| 6,507,487 B1 * | 1/2003 | Barina et al. ................ 361/685 |
| 6,530,551 B2 * | 3/2003 | Gan ........................... 248/694 |
| 6,538,879 B2 * | 3/2003 | Jiang ........................... 361/683 |

* cited by examiner

Primary Examiner—Lisa Lea-Edmonds
(74) Attorney, Agent, or Firm—Carlos Munoz-Bustamante; Ronald V. Davidge

(57) ABSTRACT

A computing system includes a pivoting mounting structure for mounting one or more electronic devices. The mounting structure is itself mounted to pivot between an operating position, within the computing system, and a service position, with the pivoting mounting structure extending outside the computing system for the installation or removal of electronic devices. A releasable latch prevents movement of the mounting structure from its service position.

8 Claims, 2 Drawing Sheets

STRUCTURE FOR MOUNTING COMPUTER DRIVE DEVICES, PIVOTABLE BETWEEN OPERATING AND SERVICE POSITIONS, AND LATCHABLE IN THE SERVICE POSITION

CROSS-REFERENCE TO A RELATED APPLICATION

This application is related to a co-pending U.S. application Ser. No. 09/708,349, filed Nov. 8, 2000, having a common assignee with the present invention, the disclosure of which is hereby incorporated by reference. This copending application describes a computing system including a frame and a drive mounting structure for mounting one or more drive units within the computing system, with the drive mounting structure being pivotally and removably mounted on the frame to move between an operating position, in which an internal end of a drive unit mounted within the drive mounting structure is held within the computing system, and a service position, in which the internal end of the drive unit extends outward from the computing system. In the service position, access is provided to an open end of the drive mounting structure, into which the drive unit can be installed, to the internal end of the drive unit, for attachment of a cable, and to a side of the drive mounting structure, through which fasteners are driven to mount the drive unit within the drive mounting structure. A support bracket, pivotally mounted on the drive mounting structure, is manually pivoted outward position to hold the drive mounting structure in its service position, and is manually pivoted back to allow the drive mounting structure to return to its operating position and to provide clearance for a system cover.

BACKGROUND INFORMATION

1. Field of Invention

This invention relates to a cage or bracket for mounting one or more electronic devices within a computer, particularly to such a cage or bracket pivotable between an operating position, in which the electronic devices are held in place within the computer, and a service position, in which the electronic device(s) is/are moved outward from the computer for removal or installation, and, more particularly, to such a cage or bracket which is latched in place in the service position.

2. Description of the Related Art

Typical computer systems include a number of device bays, in which drive devices are mounted by installation from the front of the system. Such drive devices, which are often called DASD (Direct Access Storage Device) drives, include floppy disk drives, hard disk drives, and CD ROM drives. Often, these bays do not provide access to insert screws to engage the threaded mounting holes provided within the drive devices. While these mounting holes are typically provided along the left and right sides of the drive device, and often also along the bottom surface of the drive device, in many computing systems the bays only provide for attachment access from the front of the system. In many computer systems, drives are mounted in a side-by-side arrangement, preventing access to the screw holes on the side of each drive adjacent the other drive. Therefore, a number of adapters have been devised to fasten to various of the threaded mounting holes of a drive device, with the device attached to the adapter being installed from the front of the computer system. For example, a slide may be screwed to each side of a drive device, with the frame surfaces forming the drive bay being adapted to provide recesses for sliding engagement with the slides on opposite sides of the drive device.

What is needed is a structure, such as a cage, for mounting a drive, which is itself movable from an operating position, in which it is held closely among adjacent structures of the computing system, and a service position, in which access to the screws mounting the drive within the structure. It is particularly desirable that at least one drive unit may be mounted within such a structure without a need to attach side rails or other types of adapter plates.

U.S. Pat. No. 5,572,402 describes a hard disk drive mounting assembly for a computer, in which the disk drive mounting assembly includes a hard disk drive case held in the computer body by pins oppositely protruding from respective lower portions of the exterior surfaces of a pair of opposed sides of the hard disk drive case, having rails on the interior surfaces of those opposed sides, and having apertures in those opposed sides, and having apertures in those opposed sides into which rail hooks can be inserted. The hard disk drive case can be tipped open or closed by turning around the pins as aligned separate axles. The hard disk drive case is held closed by spring catches that engage notches in the computer body. Thus, while a latch mechanism is provided for holding the pivoting hard disk drive case closed, what is needed is an additional mechanism for holding this case in its open position. Such an additional mechanism would simplify the installation or removal of the hard disk drive by preventing the pivoting movement of the hard drive case during such an installation or removal, and would allow the easy use of the mounting assembly in an orientation in which gravity tends to close rather than open the mounting assembly.

The patent literature includes a number of descriptions of overall computer configurations using pivoting sections to provide for access to various internal components. For example, U.S. Pat. No. 5,495,389 describes a personal computer including a frame unit and a top cover mounted to pivot upward and outward to the rear of the system, or alternately upward to the side. One or more drive devices may be mounted to extend downward from the top cover. Pivoting the top cover from its closed, operating position, to its open position provides access to the drive devices from below and to components, such as adapter cards and the main system board, from above. The top cover includes, extending along its lower surface, a device-mounting bracket including a number of slotted channels. Each drive device is attached to the device-mounting bracket by means of a pair of sideplates, fastened to the sides of the device with screws, with tabs of the sideplates extending upward into the slots in the channels. When the drive device is installed, a latching mechanism holds the tabs in place within the slots. The top cover is held in an open position by means of a linkage including a detent mechanism. In this regard, what is needed is a simple mechanism preventing movement of the top cover past a stopping surface of the frame extending below the top cover, when the top cover is held open.

U.S. Pat. Nos. 5,784,251 and 5,784,252 describe personal computers each having a main chassis section and a subchassis hinged to pivot along a horizontal axis between a folded-in position, and a folded-out position. The subchassis section includes a power supply and several drive units, which move together with the subchassis as it is pivoted. In U.S. Pat. No. 5,784,251, the subchassis extends over the main chassis section, and the pivoting motion is used to provide access to a main system board mounted in the main chassis section. In U.S. Pat. No. 5,784,252, the subchassis section extends over an end portion of the main chassis section, and the pivoting motion is used to provide access within an area between the main chassis section and the subchassis.

Similarly, U.S. Pat. No. 5,973,918 describes a computing system having-a pair of drive units mounted on the top surface of a plate pivoted along the front edge of the system. Both drive units move together, with the plate as it is pivoted to gain access to components mounted below the plate.

In U.S. Pat. Nos. 5,784,251, 5,784,252, and 5,973,918, the pivoting movement does not address the problems associated with access to mounting locations for closely spaced drive units, which are directed away from the areas opened by pivoting.

Furthermore, while U.S. Pat. Nos. 5,495,389, 5,784,252, 5,784,253, and 5,973,918 describes a particular overall system configuration, having certain advantages concerning access to various components, what is needed is a device-mounting bracket mounting only a number of drive units, which can be used in various system configurations, including tower configurations A number of other U.S. patents describe apparatus for mounting drive units by sliding the units within slots in housings. The apparatus may include various brackets in which individual drive units are mounted, but the brackets are not pivoted into place, and, with the brackets being completely removed from the computer with the drive units, there is no means for holding the brackets in a service position for making device and cable attachments. Such patents include U.S. Pat. Nos. 5,564,804, 6,102,499, 6,157,540, and 6,158,699.

U.S. Pat. No. 4,268,100 describes a printed circuit board holder including an integral, generally rectangular board receptacle, which is pivotally supported above the base of a data processing device by spaced cradle posts. The receptacle can be pivoted from a normal (operating) position through an angle of approximately 90 degrees to a service position in which the receptacle bottom wall is nearly perpendicular to the base. An integral latch mechanism keeps the holder in the normal position until the latch is manually released. Multiple pin connector boards and stiffener plates are secured to the receptacle by integral latches. Again, what is needed is a latch mechanism for holding the printed circuit board holder in its service position, in order to facilitate the loading of printed circuit boards without having to manually prevent rotation of the holder.

SUMMARY OF THE INVENTION

In accordance with a first aspect of the invention, apparatus is provided for mounting an electronic device within a computing system. The apparatus includes a stationary structure of the computing system, a pivoting mounting structure for mounting the electronic device, and a releasable latch. The stationary structure includes a pivotal bearing structure and a first motion stopping surface. The pivoting mounting structure is mounted within the pivotal bearing structure to move between an operating position within the computing system and a service position, with the pivoting mounting structure extending outward from the computing system in the service position. The releasable latch is formed to move into position to hold the pivoting structure in the service position as the pivoting mounting structure is moved into the service position.

The releasable latch preferably includes a latching tab extending as a portion of the pivoting mounting structure to contact the first motion stopping surface as the pivoting mounting structure is moved from the service position toward the operating position. The stationary structure of the computing system preferably also includes an interposing tab, which extends adjacent to the latching tab, as the latching tab is held in contact with the first motion stopping surface, preventing movement of the latching tab in a first direction. The releasable latch is then released by pivoting the pivoting mounting structure to move the latching tab in the first direction away from the first motion stopping surface and the interposing tab, and by holding the latching tab away from the first motion stopping surface as the pivoting mounting structure is moved from the service position toward the operating position.

DETAILED DESCRIPTION OF THE INVENTION

Figure 1:
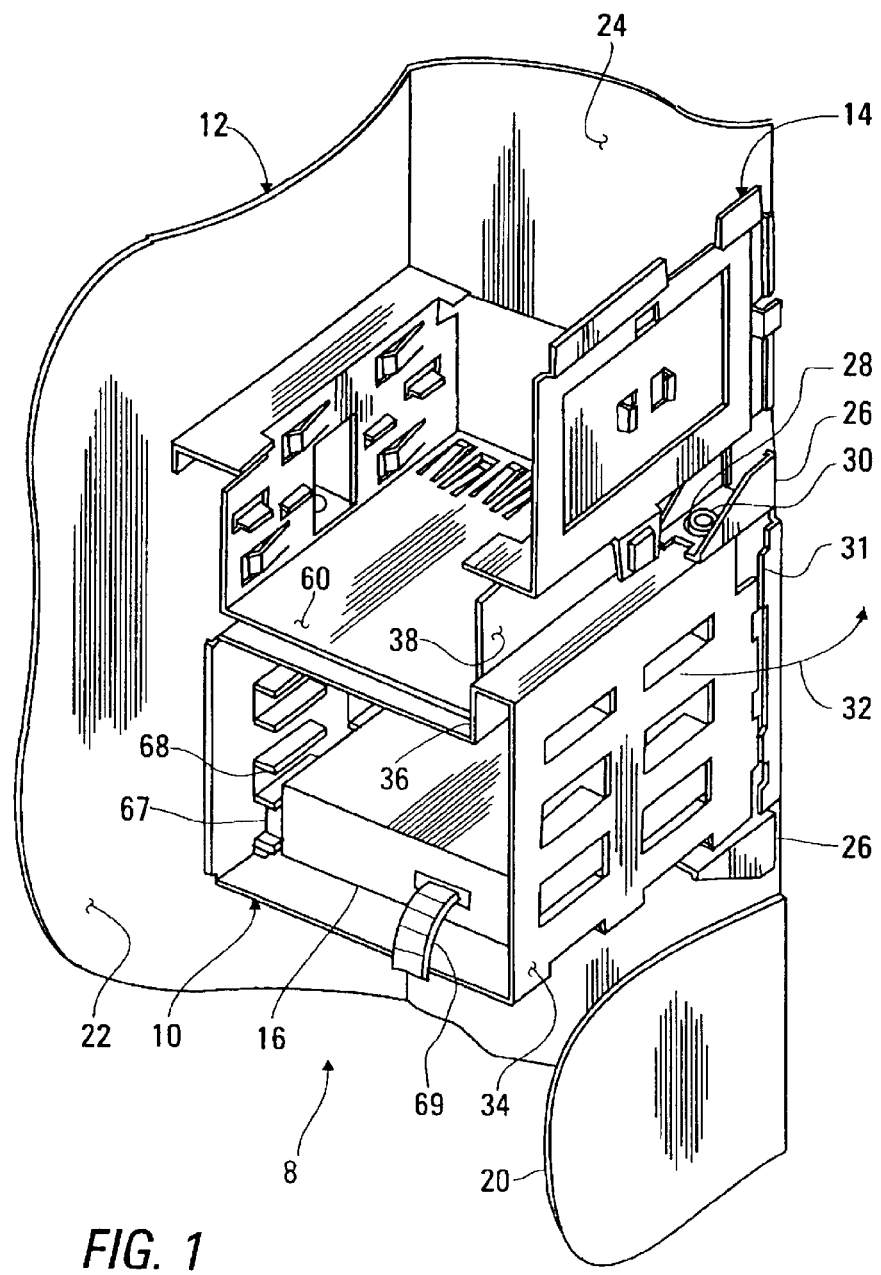
FIG. 1 is a fragmentary perspective view of a computer showing a drive mounting structure and associated components, built in accordance with the present invention, as viewed from above and behind, with the drive mounting structure in an operating position.
Figure 2:
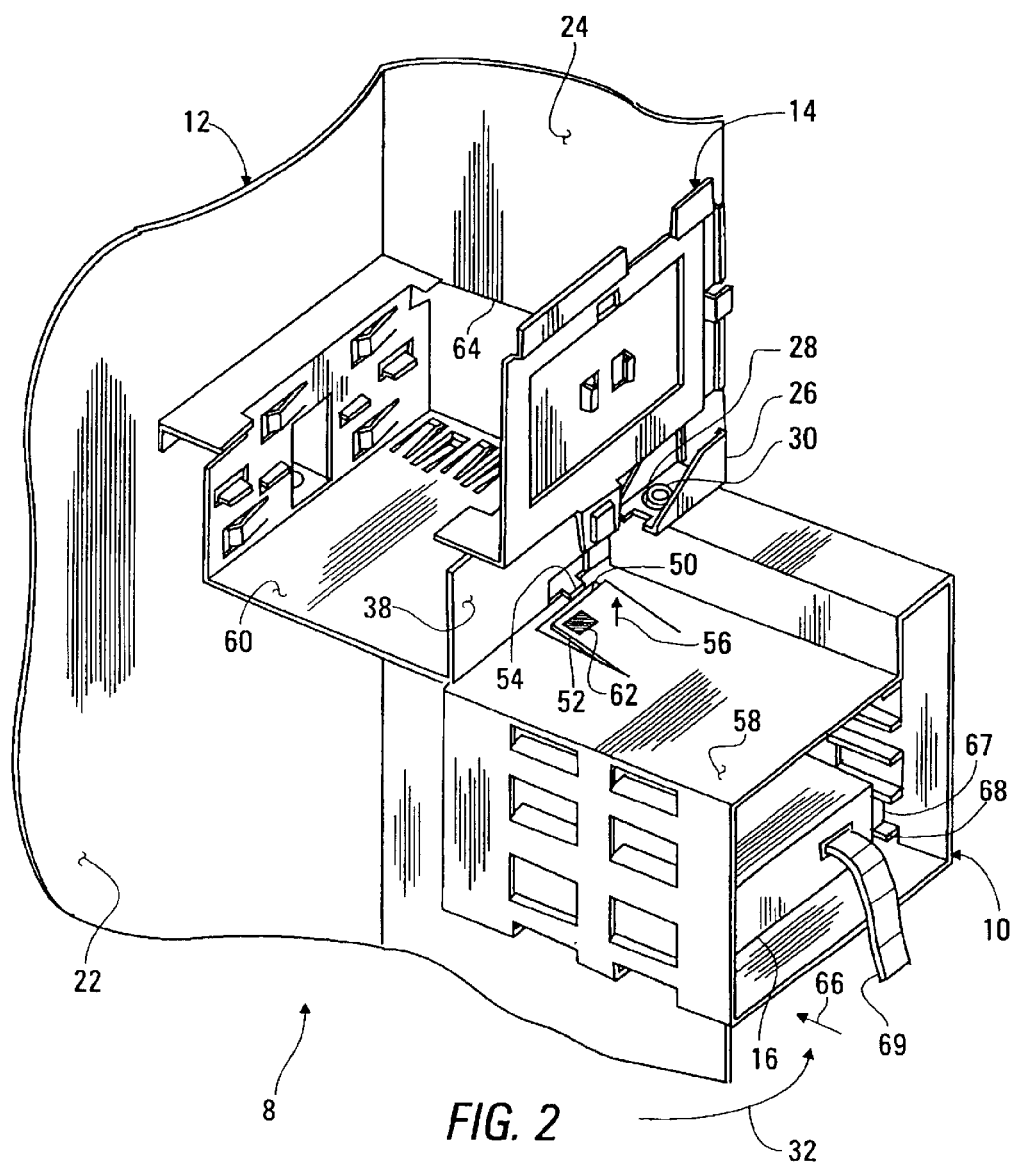
FIG. 2 is a view similar to FIG. 1, with the drive mounting structure in a service position.

FIGS. 1 and 2 are fragmentary perspective views of a computer 8 having a pivoting drive mounting structure 10, shown in an operating position from above and behind with a stationary structure, including a frame structure 12 and a stationary device mounting structure 14. FIG. 1 shows the pivoting drive mounting structure 10 in an operating position, holding one or more drive units 16 in their operating positions within a computing system, generally indicated as 8. FIG. 2 shows the pivoting drive mounting structure 10 in a service position, with the drive units 16 held in position extending outward from the-computing system 8. The pivoting drive structure 10 can only be pivoted outward, into the service position of FIG. 2, when a removable side cover 20 is removed from the computing system 8.

The frame structure 12 includes a right side frame plate 22 and a front frame plate 24, to which a pair of pivot support brackets 26 are attached. (Directional naming conventions, such as right and left, used herein are established from the front of the computing system 8, despite the fact that the figures show the system 8 from the rear.) Each of the pivot brackets 26 includes a hole 28, through which an extruded cylindrical pivot 30 extends as part of the pivoting drive mounting structure 10. The two holes 28 are vertically aligned with one another, as are the two extruded cylindrical pivots 30, so that the pivoting drive mounting structure 10 pivots about a vertical axis. In addition, a grounding spring member 31 electrically grounds the drive mounting structure 10 to the front frame plate 24.

During normal operation of the computing system 8, the pivoting drive mounting structure 10 is held in the operating position of FIG. 1, with rotation in the outward direction of arrow 32 being prevented by an interaction between the left plate 34 of the pivoting drive mounting structure 10 and the adjacent removable cover 20 of the computing system 8. Rotation of the pivoting drive mounting structure 10 opposite the direction of arrow 32 is prevented by contact between the upward-extending ledge 36 of this structure 10 and the adjacent left plate 38 of the stationary device mounting structure 14.

As the drive mounting structure 10 is opened in the direction of arrow 32 into the service position of FIG. 2, a latching edge 50 of a latching tab 52 moves past a interposing tab 54 extending from the stationary device mounting structure 14. As this occurs, the latching tab 52 moves outward, in the direction of arrow 56, past the interposing tab 54. The latching tab 52, which is formed to extend outward as a portion of an upper plate 58 within the drive mounting structure 10, is held inward against an adjacent surface of the lower plate 60 of the stationary device mounting structure 14. Further pivoting movement of the drive mounting structure 10 in the direction of arrow 32, past the position shown in FIG. 2, is prevented by contact between the left plate 34 of the pivoting drive mounting structure 10 and the grounding spring member 31, which extends along the front frame plate 24 adjacent a front end of the left plate 34.

After the latching tab 52 moves outward as shown in FIG. 2, pivoting the drive mounting structure 10 opposite the direction of arrow 32 causes the latching edge 50 of the latching tab 52 to come into contact with a first motion stopping surface 38 of the stationary device mounting structure 14, with the interposing tab 54 extending under the latching edge 50 of the latching tab 52. In this way, further pivoting movement of the drive mounting structure 14 opposite the direction of arrow 32 is prevented by this contact between the latching edge 50 and the first motion stopping surface 38 of the stationary device mounting structure 14. The installation and removal of drive units 16 then proceeds with the pivoting drive mounting structure 10 thus latched in its service position.

To return the pivoting drive mounting structure 10 to the operating position of FIG. 1, this structure 10 is again pivoted in the direction of arrow 32 to the position shown in FIG. 2, with the latching edge 50 of the latching tab 52 being moved past the interposing tab 54. The latching tab is then manually depressed, opposite the direction of arrow 56, and the pivoting drive mounting structure 10 is pivoted opposite the direction of arrow 32 into the position shown in FIG. 1. Preferably, a blue rectangle 62 is painted or printed on the surface of the latching tab, providing an indication that the tab should be depressed in this location. Once the latching edge 50 of the latching tab 52 has passed the first motion stopping surface 38 of the stationary device mounting structure 14, the latching tab 52 can be released, so that the latching edge 50 slides against the adjacent lower surface of the lower plate 60 of the stationary device mounting structure 14.

The latching tab 52 of the present invention has several advantages over the pivoting support bracket described in the co-pending application cross-referenced above (Ser. No. 09/708,349). First, the latching tab 52 moves outward without additional effort as the drive mounting structure 10 moves into its service position. On the other hand, the pivoting support bracket of the copending application must be pivoted outward manually to engage the system frame. Second, the latching tab 52 is formed as part of the upper plate 52 of the drive mounting structure 10 of the present invention; the separate support bracket and pivot pins are avoided. Third, after the latching tab 52 of the present invention is released, it slides against a lower surface of the lower plate 60 of the stationary device mounting structure 14. Thus, unlike the pivoting support bracket of the co-pending application, the latch 52 of the present invention cannot move back out to interfere with cover installation.

In the example of FIGS. 1 and 2, the pivoting drive mounting structure 10 is shown within a tower type computing system 8, being pivoted about a vertical axis. However, during the process of manufacturing the computing system 8 and often during subsequent removal and installation of one or more drive units 16 for purposes of repair or upgrading, the computing system 8 is typically placed on a table with its right side frame plate 22 facing down and with the pivoting drive mounting structure 10 facing upward. The pivoting drive mounting structure 10 is then opened in the direction of arrow 32 into the service position. With the computing system 8 in this orientation, the latching provisions made as described above with the latch plate 52 are particularly important, since, without such provisions, the pivoting drive mounting structure 10 would pivot back into the operating position of FIG. 1 under the influence of gravity.

In addition, in the example of the figures, the front frame plate 24 is shown to be solid adjacent the pivoting drive mounting structure 10, while an aperture 64 extends adjacent the stationary device mounting structure 14. This represents a computer system 8 in which the pivoted drive mounting structure 10 is used to mount hard disk drives, which do not require access from the front of the computing system 8, while the stationary device mounting structure 14 is used to mount drive devices using removable media, such as floppy diskettes, or compact disks. Such removable media are inserted into the drive devices, and removed therefrom through the aperture 64.

In the computing system 8, up to three hard disk drives 16 may be installed in the pivoting drive mounting structure 10 in its service position, with each of the drives being inserted in the direction of arrow 66 and removed opposite this direction. Each hard disk drive 16 is slidably mounted by means or a pair of rails 67, sliding between opposing pairs of tabs 68. Each hard disk drive 16 is also electrically connected through one or more cables 69, which are long enough to allow their connection and disconnection with the pivoting drive mounting structure 10 in its service position. Additional hardware (not shown) may be used for mounting the drives, with such hardware including latches, and/or screws accessed with the pivoting drive mounting structure in its service position.

Alternately, the pivoting drive mounting structure can readily be used to mount other types of electronic devices, including drives using removable media, with a suitable aperture being provided in the front frame plate 24.

The pivoting drive mounting structure 10 can thus be used to mount electronic devices in a space within the computing system 8 where access to the devices is blocked. In general, such access may be blocked by other components, such as circuit cards or a power supply (not shown) extending behind the pivoting drive mounting structure 10. When hard disk drives or other devices not requiring access to removable media are mounted, the resulting elimination of a requirement to install or remove such devices through the front of the computing system 8 is significant, since removable bezels in the front cover are not required.

While the present invention has been described in its preferred form or embodiment with some degree of particularity, it is understood that this description has been given only by way of example, and that numerous changes in the details of construction, fabrication, and use, including changes in the combination and arrangement of parts, may be made without departing from the spirit and scope of the invention.

What is claimed is:

1. Apparatus for mounting an electronic device, within a computing system, wherein said apparatus comprises:
    a stationary structure of said computing system, including a pivotal bearing structure and a first motion stopping surface;

a pivoting mounting structure for mounting said electronic device, wherein said pivoting mounting structure is mounted within said pivotal bearing structure to move between an operating position within said computing system and a service position, wherein said pivoting mounting structure extends outward from said computing system; and a latching tab extending as a portion of said pivoting mounting structure to contact said first motion stopping surface as said pivoting mounting structure is moved from said service position toward said operating position, wherein said latching tab is formed to move into position to hold said pivoting mounting structure in said service position as said pivoting mounting structure is moved into said service position, and wherein said latching tab is released to permit movement of said pivoting structure into said operating position by holding said latching tab away from said first motion stopping surface as said pivoting mounting structure is moved from said service position toward said operating position.

2. The apparatus of claim 1, wherein said stationary structure includes a first wall extending perpendicularly from said first motion stopping surface, said pivoting mounting structure includes a second wall extending adjacent said first wall, and said latching tab is formed as a portion of said second wall to contact said first wall with said pivoting mounting structure in said operating position.

3. The apparatus of claim 1, wherein said stationary structure of said computing system additionally includes an interposing tab, said interposing tab extends adjacent said latching tab in contact with said first motion stopping surface, preventing movement of said latching tab in a first direction, and said latching tab is released to permit movement of said pivoting mounting structure into said operating position by additionally pivoting said pivoting mounting structure to move said latching tab away from said first motion surface and said interposing tab, and by moving said latching tab in said first direction away from said first motion stopping surface, before holding said latching tab away from said first motion stopping surface as said pivoting mounting structure is moved from said service position toward said operating position.

4. The apparatus of claim 3, wherein said stationary structure includes a first wall extending perpendicularly from said first motion stopping surface, and said pivoting mounting structure includes a second wall extending adjacent said first wall, said latching tab is formed as a portion of said second wall to contact said first wall with said pivoting mounting structure in said operating position.

5. The apparatus of claim 4, wherein said latching tab includes a visible marking indicating a location to be depressed to deflect said latching tab in said first direction.

6. The apparatus of claim 1, wherein said structure includes a frame plate extending in front of said pivoting mounting structure in said operating position.

7. The apparatus of claim 1, wherein said pivotal bearing structure extends adjacent a front corner of said pivoting mounting structure.

8. The apparatus of claim 1, wherein pivoting mounting structure includes a plurality of bays for mounting a plurality of electronic devices.

* * * * *